Sept. 12, 1961 C. D. LINNENBANK 2,999,352
DETACHABLE CHAIN JOINING LINK
Filed Sept. 13, 1960 2 Sheets-Sheet 1

INVENTOR
CHARLES D. LINNENBANK
BY Cushman, Darby & Cushman
ATTORNEYS

Sept. 12, 1961  C. D. LINNENBANK  2,999,352
DETACHABLE CHAIN JOINING LINK
Filed Sept. 13, 1960  2 Sheets-Sheet 2

INVENTOR
CHARLES D. LINNENBANK
BY Cushman, Darby & Cushman
ATTORNEYS

# United States Patent Office 2,999,352
Patented Sept. 12, 1961

2,999,352
DETACHABLE CHAIN JOINING LINK
Charles D. Linnenbank, Media, Pa., assignor to Baldt Anchor, Chain & Forge Division of The Boston Metals Company, Chester, Pa., a corporation of Maryland
Filed Sept. 13, 1960, Ser. No. 55,769
3 Claims. (Cl. 59—87)

This invention broadly relates to chains and more particularly to detachable chain linkages especially adapted for the convenient connecting and disconnecting of chain sections and the like.

The detachable chain link with which the present invention is concerned is preferably used for detachably joining stud-link marine anchor chains, but is equally suited for the convenient detachable connection of any conventional type chain and/or chain appendages, such as rings, hooks, eyes, swivels, shackles, turnbuckles, anchors, and the like.

Generally speaking, in marine practice the bow of a vessel is usually provided with two relatively long chains or "cables," each having an anchor attached to the free end thereof, the other end thereof passing through a windlass or the like. Commonly, these cables are disposed on the port and starboard sides, respectively, of the vessel and usually consist of a number of 90-foot sections of anchor chain coupled together, end to end, by means of detachable chain links. As will be appreciated, the strength of these detachable chain links must be at least equal to and preferably greater than that of the chain sections which they connect. All of the individual links in each of the 90-foot chain sections are identical in all respects, and the outside dimensions of the detachable joining links must conform with them in general configuration and size in order that the whole cable assembly, including the detachable joining links, may pass readily and smoothly through the link-pockets of the windlass.

All of the links in the cable assembly, including the joining links, are provided with central cross-members called "studs." These studs serve to stiffen or reinforce the sides of the link against possible lateral collapse which would cause a lengthening of the link. Such lengthening is, of course, undesirable since it causes the links to no longer match the pitch of the link-pockets of the chain windlass. Furthermore, the studs serve to prevent kinking and tangling of the chain when piled at random in the chain locker or on the ocean floor.

While there are presently available a number of types of detachable joining links, it seems that each of them has at least some disadvantage which makes them unsatisfactory for use in all applications. For example, many conventional links are either formed by casting, or otherwise manufactured in such a way that they do not have adequate toughness and strength, and hence are vulnerable to cross-bending, lateral collapse, and general abuse. Generally, it is desirable that joining links of the type described be of greater strength than the chain to which they are connected so that, among other things, they will be suited to repeated reuse. Furthermore, many conventional detachable joining links are of relatively complicated construction, comprising three or more different parts in many instances, and thus required the inventorying of a relatively large number of different parts on the vessel, as well as special tools to facilitate their assembly and disassembly. These relatively complicated links are also comparatively expensive to manufacture and are not ideally suited to mass production techniques utilizing standard machine tooling, and the attendant economic benefits thereof.

It is therefore a primary object of the present invention to provide a novel detachable chain link for joining chains together, which link is of extremely simple and hence economical construction, yet which is provided with strength greater than the ordinary chains with which it will be used.

A further object of the present invention is the provision of a novel detachable chain link comprising a minimum number of parts, each of which is of extremely simple design, whereby assembly and disassembly of the link may be effected very simply without the use of special tools or special skill.

Yet another object of this invention is the provision of a novel detachable chain link comprising only two different basic parts, each of which is substantially symmetrical about both its major axes, whereby the cost of manufacture, assembly and storage may be minimized.

Another object of the present invention is the provision of a novel detachable chain link having a general size, pitch and configuration conforming with that of the links common to the chains with which it is used, and having strength and toughness sufficient to resist tension, shock, cross-bending, lateral collapse, and general abuse, to even a greater degree than the chain to which it is to be connected.

A further object of the present invention is the provision of a novel detachable chain link of irreducibly simple design which is inherently suited to economical fabrication, as well as to nondestructive foolproof assembly and disassembly whereby repeated reuse of the link is made possible.

These and other objects of the present invention will become apparent from consideration of the present specification taken in conjunction with the accompanying drawings in which there are shown several embodiments in the invention by way of example, and wherein.

Generally speaking, a detachable chain link embodying the principles of the present invention comprises four basic parts, namely a pair of end elements 10 and 12, and a pair of caps 14 and 16. As will be appreciated, end elements 10 and 12 are identical in all respects, and are thus interchangeable. Similarly, caps 14 and 16, at least just prior to final assembly, are also completely identical and thus interchangeable. As will be more fully described hereinafter, the assembly may be held together by means of either a tapered pin or a straight pin, as at 18 and 20, respectively. The present invention also concerns the provision of a highly economical method of manufacture for a detachable chain link.

Figure 1:
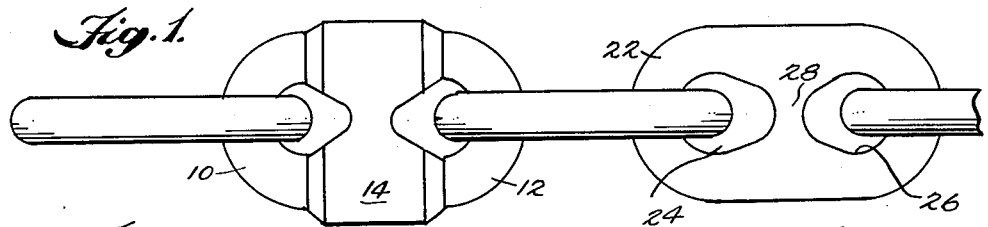
FIGURE 1 is a plan view of a detachable link embodying the principles of the present invention, shown joining the adjacent ends of two conventional chain sections.

Referring more particularly to the drawings, there is shown in FIGURE 1 the joining of two sections of conventional stud-link anchor chain by means of the present invention. The individual links of the chains with which the present invention is being associated are identical to each other in all respects and are of conventional configuration. For example, referring to a representative link 22, it will be noted that they are of rounded configuration having apertures 24 and 26 therethrough, separated by a cross-member or stud 28. It is contemplated that the detachable links of the present invention have a generally similar overall shape, so that it will form an integral part of an assembled chain, and so that it will pass readily and smoothly through the link-pockets of a windlass. In this regard, it is important that the joining links be of the same pitch as the links constituting the associated chain sections.

As discussed above, it is essential that the respective parts of the detachable chain link be of maximum strength and toughness, preferably to the extent that they will be able to withstand loads and shocks even greater than conventional links. One reason for this is that they must be adapted to be used repeatedly an indefinite number of times without wearing out or becoming in any way deformed or weakened. Generally, when high strength links are desired, it has often been found that the forging of high strength steel is the only manner in which parts of desired strength and toughness, as well as shape, may be obtained. However, forging is usually relatively expensive and time consuming, and does not result in highly accurately dimensioned or smoothly finished parts. Casting, of course, is unacceptable because of the low strength product which results therefrom.

Accordingly, to reduce costs, and yet obtain adequate strength and toughness, it is contemplated that two of the members of the present invention, namely the end elements 10 and 12, may be fabricated using high volume, low cost manufacturing techniques. It is believed that to form approximately half of the basic parts of a detachable chain link of the type described by means of mass production techniques, while maintaining maximum strength and toughness, is unique in the art.

Figure 5:
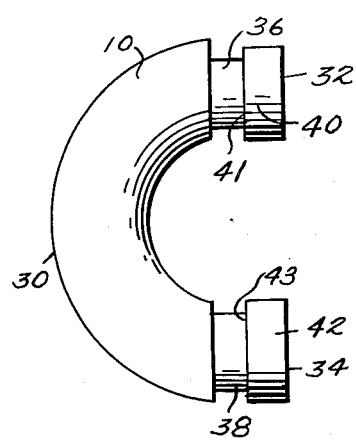
FIGURE 5 is a plan view of one of the parts thereof in a fully manufactured condition.

Since end elements 10 and 12 are identical to each other in all respects, they henceforth will be referred to by reference numeral 10, one such end element being clearly illustrated in FIGURE 5. Considering in greater detail the specific structure of an end element, it will be observed that the finished product is of substantially U-shaped configuration, having a round cross-section. Thus, each end element 10 is provided with a bight portion 30 and leg portions 32 and 34. Each of the leg portions 32 and 34 is provided with attaching means in the form of a reduced diameter neck portion 36 and 38, respectively, adjacent to but spaced from the free end thereof. These neck portions define buttons 40 and 42, respectively, having gripping shoulders 41 and 43, respectively, by means of which the end elements 10 are securely but releasably held in position by the cap members 14 and 16.

Figure 6:
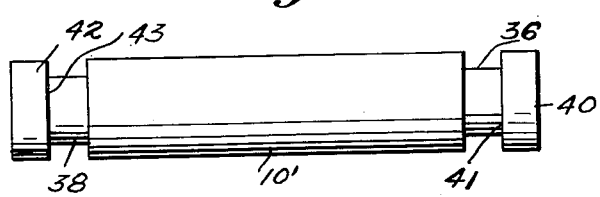
FIGURE 6 illustrates the part shown in FIGURE 5, but in a partially fabricated state.

End elements 10 are readily adaptable to several manufacturing techniques, however, the preferred method is one utilizing mass production techniques, wherein sufficient strength and toughness may be achieved and yet costs brought to a minimum. This preferred method contemplates the use of automatic lathes, or the like, to readily and inexpensively mass produce the end elements from rolled rods of the desired diameter, with the neck portions 36 and 38 and the buttons 40 and 42 thereof being formed by machining operations. The resulting end element blank 10' would thus appear as illustrated in FIGURE 6. The machined blanks are then die-bent to the shape illustrated in FIGURE 5, as by means of conventional bending equipment, and subsequently heat treated to the required strength and toughness. The end elements are then ready for assembly into finished links.

Alternately, if desired, the end elements may be drop-forged integrally to the shape illustrated, and subsequently heat treated to the desired strength and toughness, at which time they would be ready for assembly. However, this method is not deemed as satisfactory as the preferred method for the reasons discussed. One great advantage of the preferred method of manufacture is that the shoulders 41 and 43 of the buttons 40 and 42 will be truly perpendicular to the neck portions 36 and 38, respectively, and thus will afford true and square bearing surfaces, free from the draft and the decarburized surfaces associated with cast or forged end elements, as heretofore produced. As will be appreciated, these shoulders are subjected to the full tensile load across the link when the chain is under load.

In order to achieve maximum strength and toughness, it is contemplated that the end elements 10 may be formed of heat treatable alloy steel, or any other suitable high strength metallic material. The diameter of the cross-section of the end elements 10, including that of buttons 40 and 42 should be at least equal to the "wire" diameter of the sections of chain which are to be connected. In this regard, the nominal size of a chain is represented by the diameter, in inches, of the "wire" from which the chain is coiled. Chains ordinarily range from one-half inch to four inches in "wire" diameter, and usually weigh from a fraction of a pound up to 200 or more pounds per single link. Upon this chain and upon its detachable joining links the safety of the vessel and cargo may at times depend, as well as the lives of the personnel. A three inch joining link, for example, is required to support a load of over a million pounds in tension. It is therefore important that the detachable joining links be at least as strong as the chain sections to be connected.

Similarly, the neck portions 36 and 38 must be of sufficient diameter that their tensile strength after heat treatment is at least equal to the tensile strength of the wire from which the links of the chain sections to be connected are formed. As will be appreciated, the buttons 40 and 42, by means of the shoulders thereon, constitute the means for supporting the tensile forces across an assembled link when under load.

In order to releasably secure the end elements into position to form a detachable chain link, there are provided cap means in the form of two substantially identical shaped cap members 14 and 16. Since the two cap members which make up a single link are identical in shape, at least up to the final assembly operation, they both will be referred to by reference numeral 14, and are clearly illustrated in FIGURES 7 through 11. Thus, referring to FIGURES 7 and 8, it will be noted that each cap member 14 is of substantially hour-glass configuration in plan, having a smoothly contoured outer surface 44 and an oppositely disposed mating surface 46. Provided in the mating surface 46 of each cap member 14 are four relatively deep symmetrically located recesses 48, adapted to receive the buttons of the end elements. There are also provided shallower recesses 50 concentric with recesses 48 and extending therefrom to the outer periphery of the cap member. All of the recesses 48 and 50 are substantially semi-circular in configuration.

Figures 7, 9:
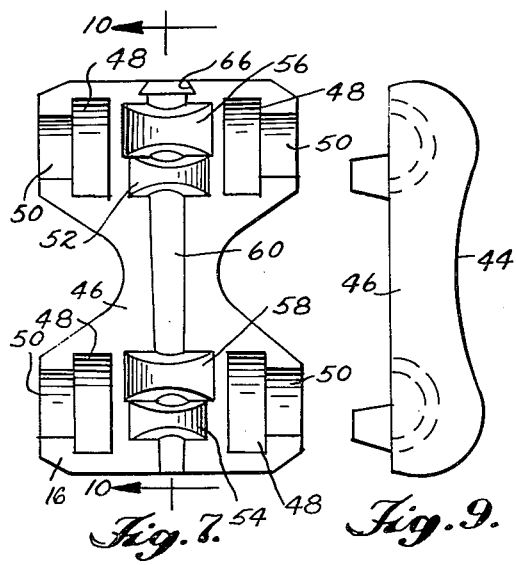
FIGURE 7 is a plan view of the inside or mating face of another part thereof.
FIGURE 9 is a side elevational view thereof.
Figures 10, 11:
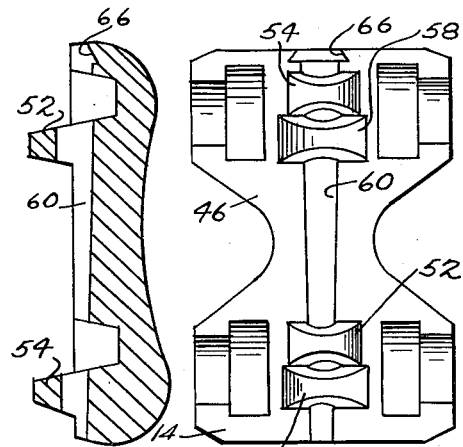
FIGURE 10 is a sectional view taken along line 10—10 in FIGURE 7.
FIGURE 11 is a plan view of a part complementary to the part illustrated in FIGURE 7, relatively inverted endwise and ready for assembly therewith.
Figure 8:
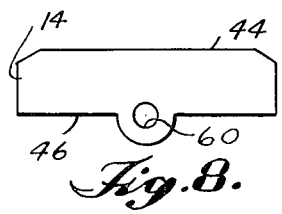
FIGURE 8 is an end elevational view of the part illustrated in FIGURE 7.

Each cap member 14 is also provided on the mating surface thereof with a pair of outwardly extending lugs 52 and 54, and a pair of inwardly extending recesses 56 and 58. The location of these recesses and lugs with respect to each other is clearly illustrated in FIGURE 7. Thus, as will be apparent, two such cap members 14, when reversed end to end with respect to each other, will mate or intermesh when the mating surfaces thereof are put into contact with one another. FIGURES 7 and 11 illustrate two cap members in side by side relationship, with one of them reversed end to end with respect to the other. As can be clearly visualized, if one cap member is flopped over onto the other they will clearly intermesh or mate, with the lugs 52 and 54 of one extending into the recesses 58 and 56, respectively, of the other.

The cap members 14 are designed so that they may be drop-forged from any suitable heat treatable steel, preferably an alloy giving maximum strength and toughness. After the forging of the cap member blanks and before the heat treatment thereof, recesses 48 and 50 may be formed by gang milling machine operations, which will remove the decarburized surfaces and forging draft and thus afford clean, square and true seating surfaces for the buttons on the end elements. The recesses 56 and 58, and lugs 52 and 54 may be formed entirely by forging, and need not be machined since they do not present critical bearing surfaces.

Figure 13:
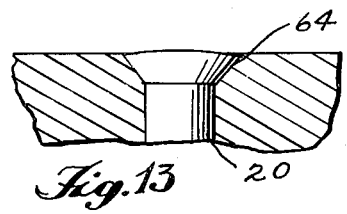
FIGURE 13 is a fragmentary sectional view illustrating a modification of the embodiment shown in FIGURE 12.
Figure 12:
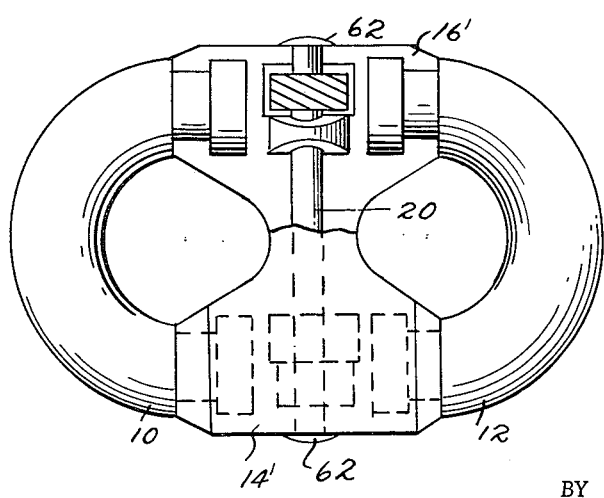
FIGURE 12 is a plan view of a second embodiment of the invention, with certain parts broken away.
Figure 14:
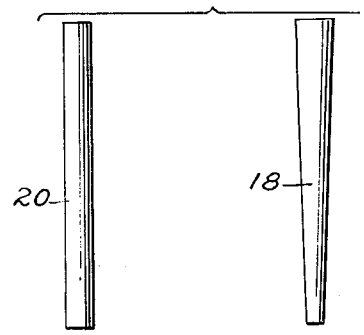
FIGURE 14 is a plan view of the pins which respectively serve to hold the two embodiments together in fully assembled condition.

At this point in the fabrication of detachable chain links according to the present invention, all the cap members are identical with one another, as are the end elements. The next operation is that of assembly of the final link. This is achieved by clamping the buttons of two end elements 10 between two cap members 14, in the manner illustrated in FIGURE 2. This assembly is then tightly held together and a hole drilled through the two cap members, at the juncture therebetween. As can be seen, this hole passes through both of the lugs on each of the cap members, and is indicated at 60. Assuming, at this point, that this hole is non-tapering, as in the cap members 14' and 16' of FIGURE 12, there are several methods of assembly which may be utilized. For example, an ordinary hardened pin 20 may be inserted snugly into the hole 60 and peened at the ends, as at 62 in FIGURE 12, to hold it in place. Such a pin may be removed when desired simply by chipping off one of the portions 62 and then knocking the pin out by means of a suitable drift pin. Alternately, the pin may be fixedly secured in place in the manner illustrated in FIGURE 13, wherein the cap members are provided with countersunk portions 64. In this embodiment the pin 20 is also peened so that it will stay in position, but because of the countersunk portions 64 there is presented a substantially flush outer surface. In any case, the pin will serve to tightly hold the cap members together by virtue of the fact it passes through the lugs on both.

Figure 2:
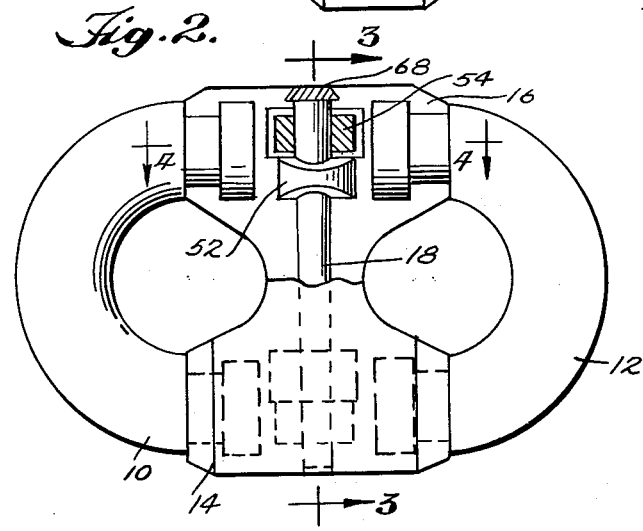
FIGURE 2 is a plan view thereof in fully assembled condition, with parts broken away.
Figure 3:
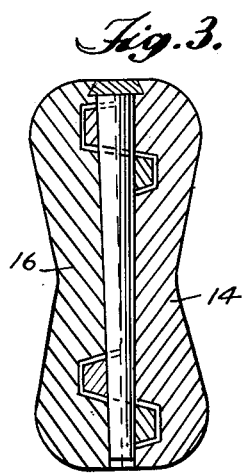
FIGURE 3 is a sectional view taken along line 3—3 in FIGURE 2.
Figure 4:
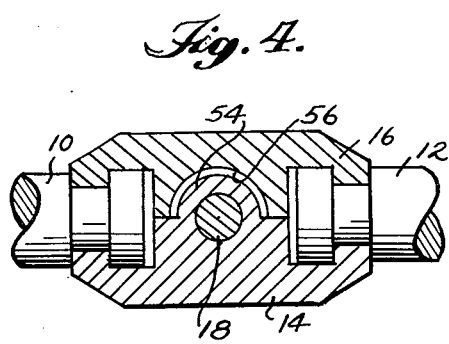
FIGURE 4 is a sectional view taken along line 4—4 in FIGURE 2.

Another method of assembly may be achieved by tapering the hole 60 through the clamped together cap members, as by means of a tapered ream. Into the tapered hole would then be inserted a suitable hardened tapered pin 18, in the manner illustrated in FIGURES 2 through 4. To securely hold tapered pin 18 in a locked position, cap members 14 may be provided with a reversed countersunk portion 66 into which a retaining plug 68 of any suitable plastic material, preferably lead or the like, may be easily hammered, as illustrated in FIGURE 2. Unintentional loosening of the tapered pin 18 is thus prevented. To disassemble the link, an ordinary drift pin may be driven smartly into the lower open end of the tapered hole to expel the leaden pellet or retaining plug 68 and loosen and remove the pin 18, at which time the paired cap members 14 will be separable so as to release their grasp on the buttons of the end elements.

One important aspect of the present invention is the provision of a detachable chain link basically comprising only two different parts. As is apparent, this feature exists up to the point when hole 60 is tapered. Once hole 60 has been tapered the mating pair of cap members are no longer exactly identical, however, they are substantially identical and differ only as regards the tapered hole, and with respect to the countersunk portions 66, if provided. Thus, when it is desired to minimize the amount of inventory which must be maintained on shipboard, the parts making up the present detachable link may be supplied with only a straight hole through the juncture of the cap members, or if desired, with no hole at all. In this case, when final assembly or application of a detachable link is desired using a tapered pin, it is only necessary to taper ream the already existing hole, or to drill and ream a hole if none exists. Of course, if the use of straight pins is desired, the cap members are always identical to one another and final assembly may be performed at the place of manufacture.

Thus, there is disclosed in the above description and in the drawings several exemplary embodiments of my invention, and a method of manufacture therefor, which fully and effectively accompish the objects of the invention. However, it will be understood by those skilled in the art that the specific details of construction and arrangement of parts, as described, are by way of example only and are not to be construed as limiting the scope of the invention. For example, metals or suitable materials other than steel or steel alloys may be readily used to meet special requirements. Furthermore, while the foregoing description discloses a detachable link symmetrical about both major axes, it should be noted that unsymmetrical links, or links featuring the novel end elements of the present invention might also be desirable to meet special applications.

I, therefore, do not wish to be limited to the precise details set forth, and intend the invention embody all such features and modifications as are within the scope of the appended claims.

Having thus described my invention, what I claim as new and desire to secure by Letters Patent is:

1. A detachable chain link, comprising: a pair of oppositely disposed U-shaped end elements, each of said end elements being identical in size and shape to the other and so disposed with respect to the other that the leg portions of each are directed towards and in alignment with the leg portions of the other, a pair of substantially hour-glass shaped cap members, each of said cap members being of substantially identical shape and being provided on one face with a smoothly contoured outer surface, and on the other face with a mating surface, means disposed at each end of each of said cap members on the mating surface thereof for releasably holding the leg portions of said end elements, means defining a pair of spaced recesses and a pair of similarly spaced projecting lugs on the mating surface of each of said cap members, said recesses and said lugs on one of said cap members being adapted to mate with the corresponding lugs and recesses, respectively, on the other of said cap members when both are in mating relationship, said mated pairs of said lugs and recesses lying substantially between respective aligned pairs of leg portions of said end elements, means defining a hole through said cap members when in mating relationship, said hole passing through the lugs on both of said cap members, and pin means removably disposed within said hole to releasably secure said cap members together.

2. A detachable chain link as defined in claim 1, wherein each leg portion of each of said end elements terminates in a button adjoined by a neck portion of reduced diameter, said neck portions being defined by walls disposed normal to the axes thereof, and said cap member means for releasably holding the leg portions of said end elements are machined to complement the buttons and neck portions thereof.

3. A detachable chain link as claimed in claim 1, wherein said hole and said pin means are tapered.

References Cited in the file of this patent

UNITED STATES PATENTS

| | | |
|---|---|---|
| 785,881 | Hill | Mar. 28, 1905 |
| 1,776,515 | Leahy et al. | Sept. 23, 1930 |
| 1,906,570 | Gilbert et al. | May 2, 1933 |

FOREIGN PATENTS

| | | |
|---|---|---|
| 1,006,018 | France | Jan. 9, 1952 |
| 1,052,187 | Germany | Mar. 5, 1959 |